United States Patent [19] [11] 4,096,753
Mullins [45] Jun. 27, 1978

[54] MINE EQUIPMENT
[75] Inventor: Rex Mullins, Burton Upon Trent, England
[73] Assignee: Coal Industry (Patents) Limited, London, England
[21] Appl. No.: 778,547
[22] Filed: Mar. 17, 1977

Related U.S. Application Data
[63] Continuation of Ser. No. 618,163, Sep. 30, 1975, abandoned.

[30] Foreign Application Priority Data
Nov. 19, 1974 United Kingdom ............... 50091/74
[51] Int. Cl.² ............................................. G01B 7/14
[52] U.S. Cl. .................................. 73/432 R; 340/421
[58] Field of Search ............ 73/432 R; 340/282, 421; 299/32, 33, 34, 43, 1; 61/45 D

[56] References Cited
U.S. PATENT DOCUMENTS

| 3,159,003 | 12/1964 | Kearsley | 299/33 X |
|---|---|---|---|
| 3,246,730 | 4/1966 | Bolton et al. | 198/126 |
| 3,341,843 | 9/1967 | Walsh | 340/421 |
| 3,412,391 | 11/1968 | Ward | 340/282 |
| 3,482,877 | 12/1969 | Jacobi | 61/45 D X |

Primary Examiner—Charles A. Ruehl
Attorney, Agent, or Firm—Stevens, Davis, Miller & Mosher

[57] ABSTRACT

Mine equipment for measuring conveyor advance includes two roof support assemblies and control means to ensure each of the assemblies can be advanced only when the other assembly is anchored. The two assemblies are linked by a transducer which senses movement of one of the assemblies relative to the other assembly.

9 Claims, 5 Drawing Figures

MINE EQUIPMENT

This is a continuation of application Ser. No. 618,163 filed Sept. 30, 1975, now abandoned.

This invention relates to mine equipment and in particular to mine equipment for measuring the advance of a longwall face conveyor comprising plurality of articulately connected conveyor sections.

Prior known equipment for measuring the advance of a longwall face conveyor comprises a pick-up device having a housing fixedly secured to a conveyor section with a reel of wire or cord mounted in the housing. The unwould end of the wire is anchored on an initial base line in the goaf so that each time the conveyor section advances a length of the wire equal to the conveyor advance is unwould from the reel. An indicator mechanism is drivably connected to the wire and indicates the advance of the conveyor section from the initial base line to an operator or to a control panel which is linked to a series of the pick-up devices arranged along the length of the conveyor and which, thereby, aims to control subsequent advance of individual conveyor sections to keep the conveyor sections aligned.

Unfortunately, such a pick-up device suffers from the disadvantage that the reel of wire requires frequent renewal for once a conveyor section is advanced after the reel is empty the distance of the section from the initial base line is no longer known.

An object of the present invention is to provide improved mine equipment which is simple, reliable and which requires no reloading.

According to the present invention mine equipment for measuring the advance of the longwall face conveyor including a plurality of articulately connected sections, comprises first and second components adapted to be releasably anchored adjacent to a mine goaf behind the conveyor, each of the components being capable of being advanced relative to the other component, control means for controlling actuation of the components such that, in use, each of the components is advancable only when the other component is anchored, and sensor means associated with both the components and sensitive to movement of at least one of the components relative to the other component.

Preferably, each of the components comprises a floor mounted base, a mine roof engaging member and an extensible prop or props extending between the base and the roof engaging member to anchor the component adjacent to the goaf.

Advantageously, at least one of the components includes a ram for attaching the component to the conveyor.

Preferably, both the components include rams for attachment to the conveyor, at least one of the rams being a single acting ram.

Preferably, the control means includes an interlock mechanism controlling the actuation of the rams and props.

Conveniently, the sensor means includes a linear transducer arranged to give a continuous accumulative indication of the total relative movement of one of the components relative to the other component.

Alternatively, the sensor means includes a step-impulse transducer arranged to give an interrupted or stepped accumulative indication of the total relative movement of one of the components relative to the other component.

In the latter case, the step-impulse transducer may include a pawl and ratchet arrangement.

By way of example only, one embodiment of the present invention will be described with reference to the accompanying drawings in which FIG. 1 is a diagrammatic plan of mine equipment constructed in accordance with the present invention;

Figure 1:
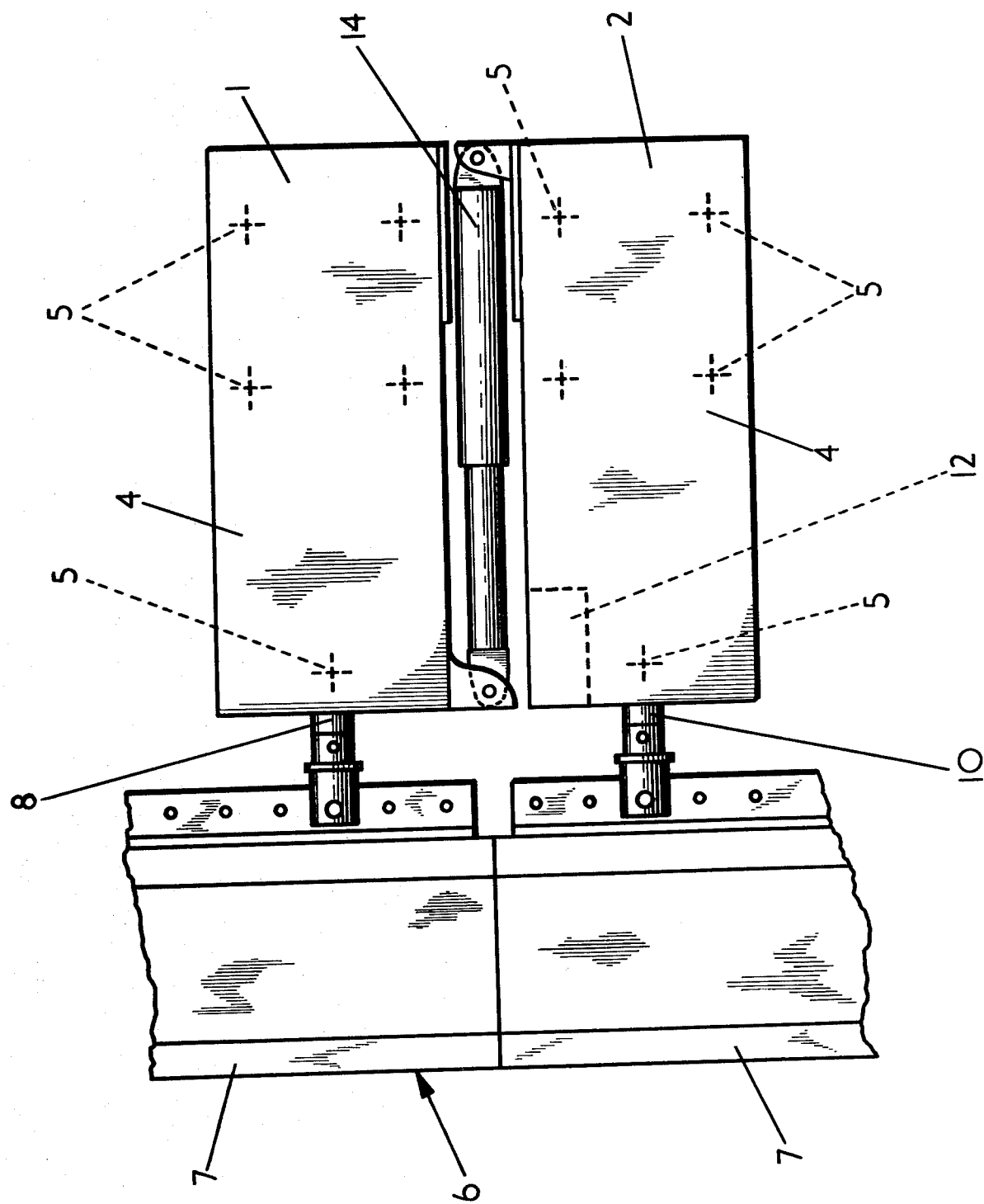
Figure 2:
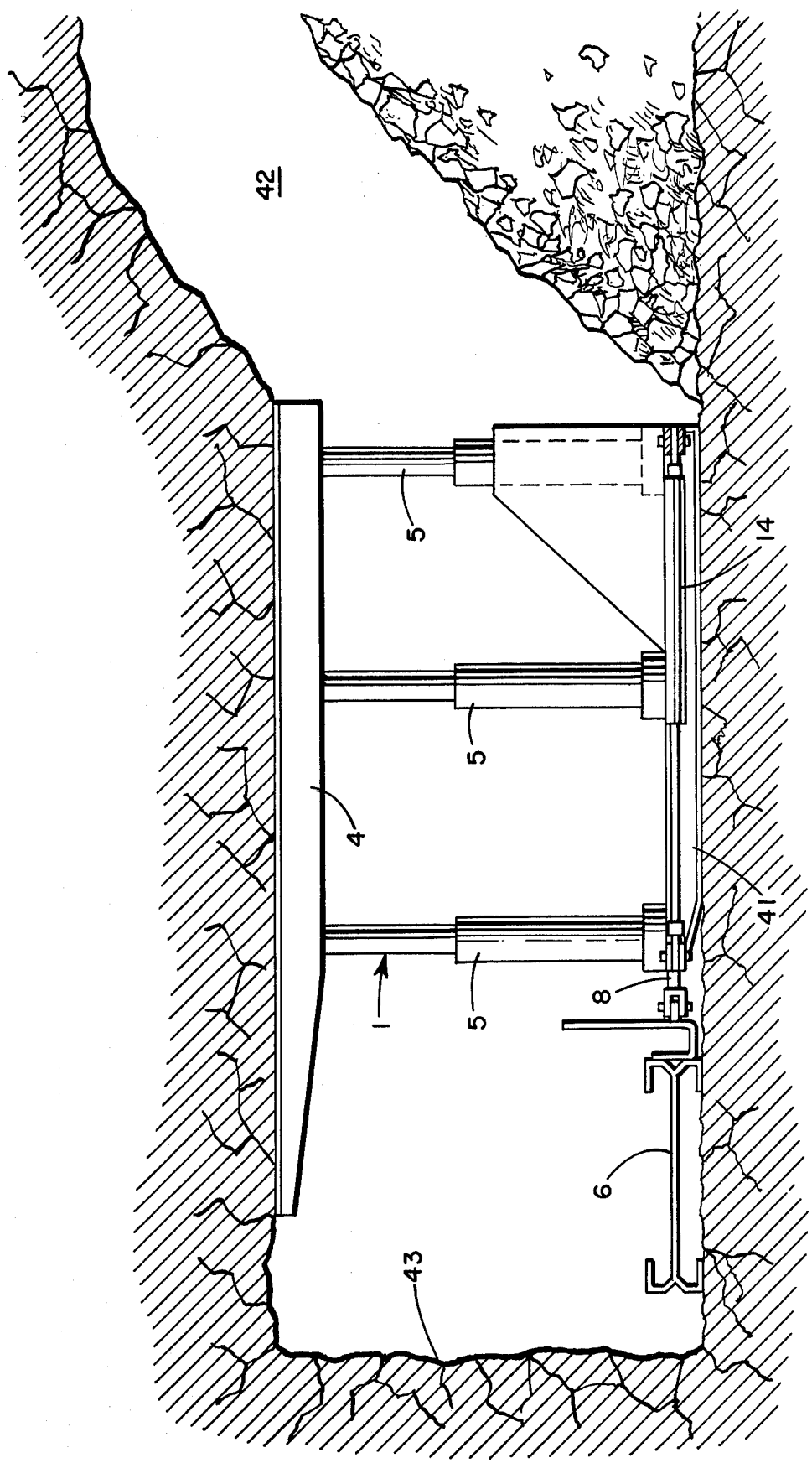
FIG. 2 is a side elevation view of the equipment of FIG. 1 taken along line 2—2 of FIG. 1.

In FIGS. 1 and 2 two mine roof supports 1 and 2 constitute first and second components each including a roof engaging canopy 4, a floor mounted base 41 and a plurality of hydraulically extensible legs 5 extending between the base and the canopy and actuable to urge the roof support into a roof supporting position when it is anchored adjacent to a goaf 42.

The base of the roof support 41 is connected to one section of a longwall face conveyor 6 comprising a plurality of articulately connected sections 7 by a double acting hydraulically actuated ram 8 which serves to advance the conveyor section towards a working face 43 and to advance the roof support 1 towards the advanced conveyor 6.

The base of the roof support 2 is connected to another section 7 of the longwall face conveyor by a single acting hydraulically actuated ram 10 which serves to advance the roof support 2 towards the advanced conveyor 6.

Control means 12 are provided on the roof support 2 to control actuation of the props and rams of both the roof supports, the control means including an interlock mechanism which ensures that one of the roof supports 1 or 2 can be advanced only when the other of the roof support 2 or 1 is anchored in a roof supporting mode.

Figure 3:
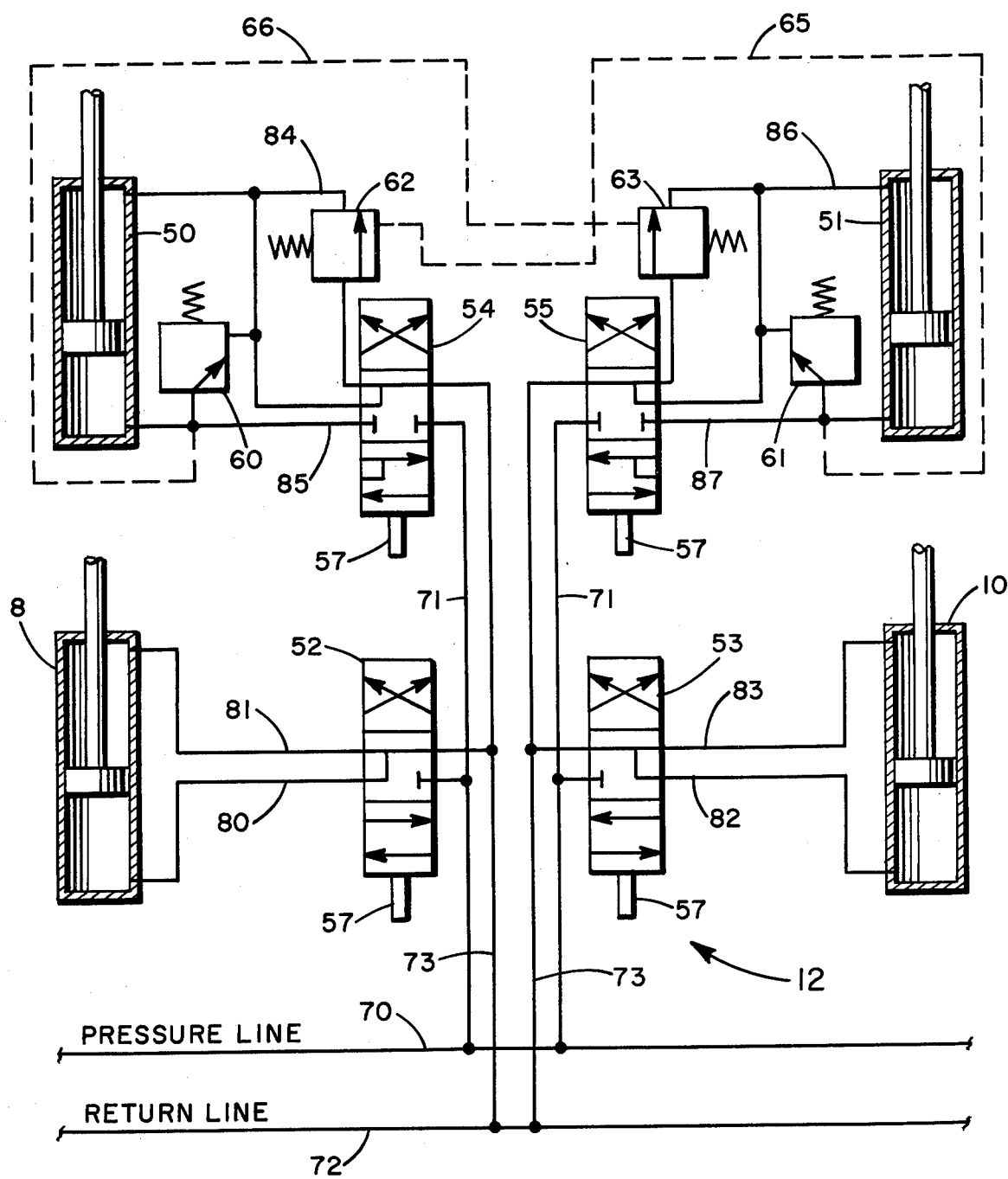
FIG. 3 is a hydraulic circuit diagram for the control of the equipment of the present invention.

In FIG. 3 one of the hydraulically extensible props of the roof supports 1 and 2 are represented by props 50 and 51, respectively. The control means 12 comprises two pairs of control valves 52 and 54 which may be actuated manually via levers 57 or by signals fed from a control panel controlling advance of the face equipment. In FIG. 3 these valves are shown in their neutral modes. The control means also comprises relief valves 60 and resiliently biassed valves 62 and 63 providing interlock mechanism ensuring that one of the supports 1 or 2 can be withdrawn from its anchored roof supporting mode only when the other of the roof supports 2 or 1 is in its anchored roof supporting mode. The valves 62 and 63 are associated with the props 50 and 51, respectively and are held open against their resilient bias by fluid pressure in pilot lines 66 and 65 which are connected to lines 87 and 85 associated with props 51 and 50, respectively. Thus, if prop 50 or 51 is not pressurized either by pressure fed to it or by the pressure of the mine roof acting on the support, i.e. the prop is not in its set mode, the valve 62 or 63 is not supplied with sufficient pressure fluid along its associated pilot line to overcome its resilient bias and is in its closed position preventing lowering of the props 51 or 50. Consequently the interlock mechanism ensures that each of the roof supports (i.e. components) is advanceable only when the other roof support (i.e. component) is anchored.

Operation of the control anchored means 12 is as follows:

Normally, when the roof supports 1 and 2 are set and the conveyor section 6 is not being advanced the valves 54 are in the neutral mode so as to provide a hydraulic lock and prevent retraction of the props 50 and 51 which thereby are retained in their set roof supporting modes. The relief valves 60 are provided to ensure the pressure of the fluid associated with the hydraulic lock does not exceed a preselected value. The valves 52 also are in the neutral mode with lines 80 and 81 from the rams 8 and 10 connected to return 72 via return lines 73.

When it is desired to advance the conveyor section 6, one or both of valves 52 is actuated into its mode to feed pressure fluid from line 71 along line 80 to extend the ram 8 and/or 10. Fluid displaced by the extension of the ram is fed along line 81 to the return line 72 via line 73.

When the conveyor section is fully advanced the valve(s) 52 is (are) returned to its (their) neutral mode(s) and one of the valves 54 is actuated to retract its associated prop 50 or 51 (i.e. to release all the legs 5 of roof support component 1 or 2 from their roof supporting positions). For the purpose of this description given here it will be assumed that the roof support 1 is being released from its set mode and advanced. Pressure fluid is fed from line 71 via the valve 54 along line 84 to the prop 50. The resiliently biassed valve 62 in line 85 has already been moved against its bias to allow fluid to flow along line 85 by the pressure of the pressure fluid in pilot line 66 sensing the pressure in line 87 of the roof support 2 which as previously explained is in its anchored roof supporting mode.

As the prop 50 is retracted, displaced fluid passes via lines 85 and 73 to the return line 72.

When the roof support 1 is retracted sufficiently to be released from the roof, the associated valve 52 is actuated to feed pressure fluid along line 81 to retract ram 8 and advance the released roof support 1. Displaced fluid from behind the piston is directed via lines 80 and 73 to return line 72. Upon the roof support 1 being advanced by a desired amount the valve 52 is returned to its neutral mode and the valve 54 is actuated to feed pressure fluid along line 85 to extend prop 50. Thereby, the roof support 1 is urged into its anchored set roof supporting mode. The pressure of the pressure fluid in line 85 is sensed by the valve 63 via pilot line 65 and, thereby, is urged against its bias to open and permit the roof support 2 to be withdrawn from its anchored set roof support position. The roof support 2 may then be advanced in similar manner to that described above with reference to the roof support 1.

As mentioned previously, the pressure relief valves 60 ensure the pressure of fluid in props 50 and 51 is limited to a preselected maximum value when the set roof supports are subject to pressure thrusts from the adjacent strata.

Sensor means 14 associated with both the roof supports 1 and 2 includes a linear transducer pivotally connected at its end to the roof supports, respectively. The linear transducer is arranged to sense movement of the roof support 2 relative to the roof support 1 and may include an indicator mechanism which indicates the total accumulative relative movement of the roof support 2 from an initial preselected datum.

Figure 4:
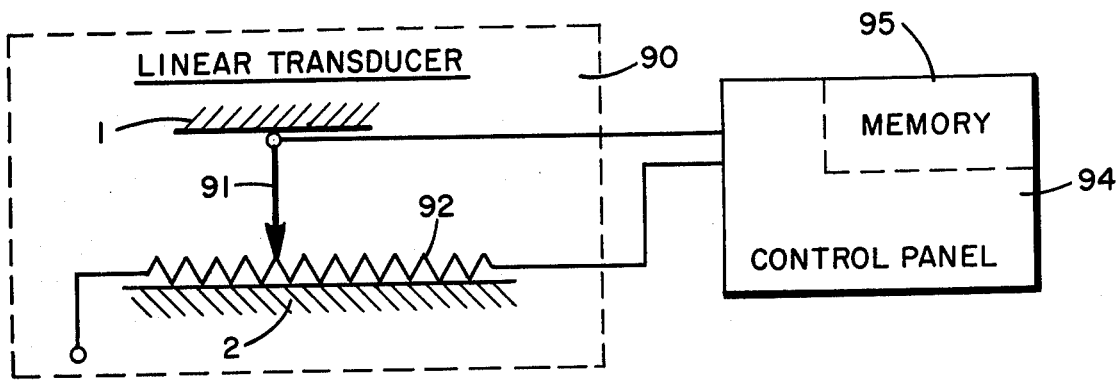
FIG. 4 illustrates a linear transducer for use as part of the equipment of the present invention.

In FIG. 4 there is shown a linear transducer 90, the slide 91 of which is attached to one roof support 1 or 2 at the body of which is attached to the other roof support 2 or 1 so that when one roof support is advanced relatively to the other roof support the slide moves over the coil 92 of the transducer. Thus, by putting a voltage across the linear transducer a continuous signal is fed to the control panel 94 which thereby controls conveyor advance to maintain the conveyor in alignment, the continuous signal being directly proportional to the relative advance of the roof supports. The control panel includes memory means 95 for retaining a record of the received signal enabling an accumulative record of the signals received from the linear transducer to be retained.

The indicator mechanism may give a visual indication to an operator on the longwall face or it may derive a signal which is fed to a control panel located in a roadway adjacent to one end of the longwall face.

In use, a series of such units are arranged along the length of the longwall face conveyor 6 and initially each is set up on an initial base line or datum with the indicator mechanism at zero reading.

As a strip of mineral is won from the working face in well known manner, the conveyor 6 is advanced towards the freshly formed face by advancing rams probably including the double acting rams 8 of the associated roof supports 1. When the conveyor is advanced by a preselected amount each roof support 1 is released from its set or anchored position and actuation of each of the rams 8 is reversed to advance the associated roof support 1. Throughout advancement of the conveyor 6 and roof support 1 the roof support 2 remains set to the roof and anchored in position. The interlock mechanism of the control means 12 ensures the setting of the roof support is not changed. As the ram 10 is single acting any movements of the associated conveyor section 7 is taken up by telescopic movement of the ram 10 and cannot disturb the set roof support 2. Once the roof support 1 is reset in the anchored position the ram 10 is actuated by the control means 12 which simultaneously ensures the setting of the roof support 1 cannot be changed, to advance the roof support 2. During advancement of the roof support 2 the sensor means senses the amount of movement of the roof support 2 relatively to the anchored roof support 1.

The sensor means may include a linear transducer, for example, a sliding potentiometer arrangement, arranged to give a continuous, accumulative indication of the amount of advance of the roof support 2 from the initial base line or datum.

Alternatively, the sensor means may include a step-impulse transducer, for example, a pawl and ratchet arrangement or a reed switch arrangement, arranged to give an interrupted or stepped accumulative indication of the amount of advance of the roof support 2 from the initial base line or datum.

Figure 5:
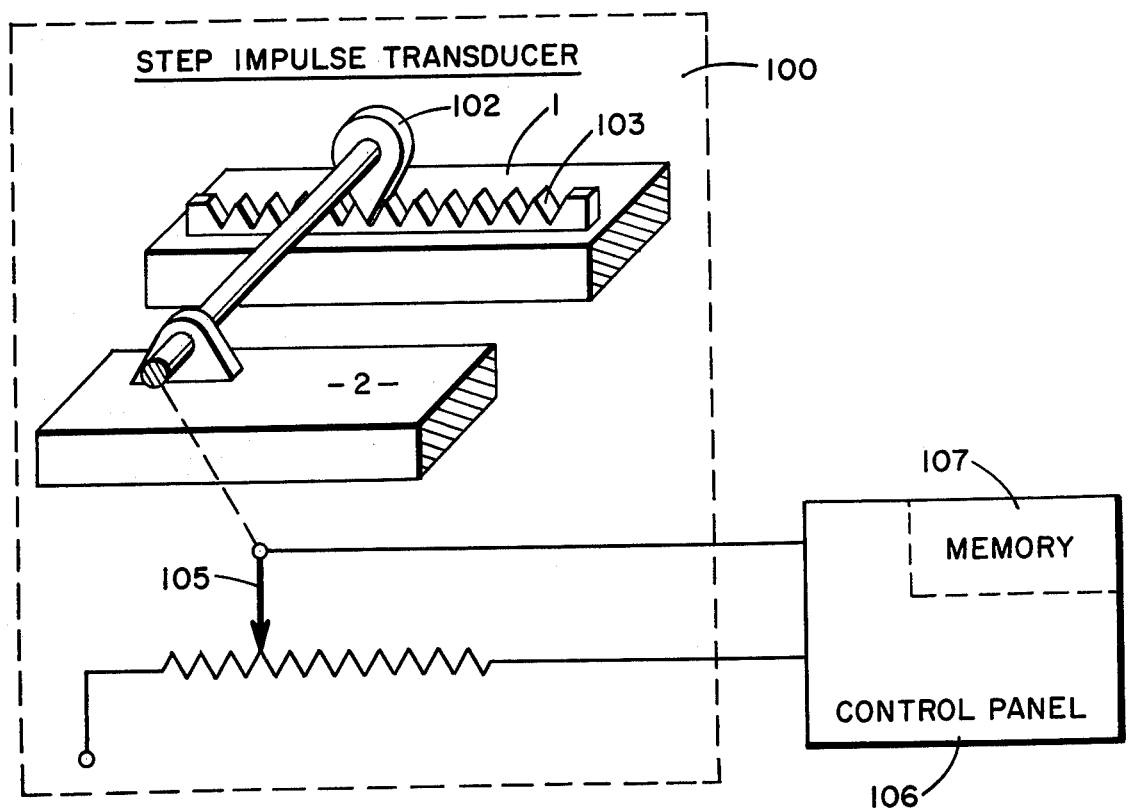
FIG. 5 illustrates a step impulse transducer for use as part of the equipment of the present invention.

In FIG. 5 there is shown a step impulse transducer 100 including a pawl 102 of which is attached to one roof support 1 or 2 and the ratchet 103 of which is attached to the other roof support 2 or 1. Consequently, as one roof support is advanced relative to the other roof support and pawl is moved along the ratchet. Each time the pawl moves one tooth of the ratchet the slider 105 of the transducer 100 is moved along a distance corresponding to one digit so that the resulting stepped signal fed to the control panel 106 indicates the relative advance. The control panel includes memory means 107 for retaining a record of the received signal enabling an accumulative record of the received signal to be retained.

In use, if a visual indication is given by the sensor means, an operator can determine from reading all the series of units which sections 7 of the conveyor 6 are ahead of the main body of the conveyor and which sections 7 are trailing behind the main body of the conveyor. By suitable adjustments to the actuation of the conveyor advancing rams acting on the different sections of the conveyor the operator can maintain the conveyor in alignment between acceptable practical limits.

If, on the other hand, the control means provided on all the series of units along the length of the conveyor feed signals to a control panel situated in a roadway adjacent one end of the longwall face, the control panel controls actuation of the conveyor advancing rams to maintain the conveyor in alignment. With this arrangement it would be necessary to provide detector means to detect the amount of advancement of the ram 8 during conveyor advance to ensure each individual conveyor section is advanced a desired amount.

In modified constructions of the units the rams 10 are connected to the associated conveyor section 7 by a short length of chain or rope to ensure movement of the conveyor cannot disturb the set of roof support 2.

In further modified constructions of the units, the rams 10 are connected to the roof support base through a lost motion device which allows limited free movement of the ram 10 relative to the set roof support.

In different embodiments of the invention the rams for advancing the roof support 2 are connected to roof support 1 instead of the conveyor.

As will be seen from the above description the present invention provides mine equipment for measuring conveyor advance which is relatively simple and which requires no reloading.

I claim:

1. Mine equipment for measuring the advance of a longwall face conveyor including a plurality of articulately connected sections, comprising first and second components adapted to be releasably anchored adjacent to a mine goaf behind the conveyor, each of the components being capable of being advanced relative to the other component, control means for controlling actuation of the components such that, in use, each of the components is advanceable only when the other component is anchored, and sensor means associated with both the components and sensitive to movement of at least one of the components relative to the other component.

2. Equipment as claimed in claim 1, in which each of the components comprises a floor mounted base, a mine roof engaging member and extensible prop means extending between the base and the roof engaging member to anchor the component adjacent to the goaf.

3. Equipment as claimed in claim 2, in which at least one of the components includes a ram for attaching the component to the conveyor.

4. Equipment as claimed in claim 3, in which both the components include rams for attachment to the conveyor, at least one of the rams being a single acting ram.

5. Equipment as claimed in claim 4, in which the control means includes an interlock mechanism controlling the actuation of the rams and prop means.

6. Mine equipment for measuring the advance of a longwall face conveyor including a plurality of articulately connected sections, comprising first and second components adapted to be releasably anchored adjacent to a mine goaf behind the conveyor, each of the components being capable of being advanced relative to the other component, control means for controlling actuation of the components such that, in use, each of the components is advanceable only when the other component is anchored, and sensor means associated with both the components and sensitive to movement of at least one of the components relative to the other component, the sensor means, including a linear transducer, arranged to give a continuous accumulative indication of the total relative movement of one of the components relative to the other component.

7. Mine equipment for measuring the advance of a longwall face conveyor including a plurality of articulately connected sections, comprising first and second components adapted to be releasably anchored adjacent to a mine goaf behind the conveyor, each of the components being capable of being advanced relative to the other component, control means for controlling actuation of the components such that, in use, each of the components is advanceable only when the other component is anchored, and sensor means associated with both the components and sensitive to movement of at least one of the components relative to the other component, the sensor means, including a step-impulse transducer, arranged to give an inerrupted or stepped accumulative indication of the total relative movement of one of the components relative to the other component.

8. Equipment as claimed in claim 7, in which the step-impulse transducer includes a pawl and ratchet arrangement.

9. Mine equipment for measuring the advance of a longwall face conveyor including a plurality of articulately connected sections, comprising first and second components adapted to be releasably anchored adjacent to a mine goaf behind the conveyor, each of the components being capable of being advanced relative to the other component, control means which includes an interlock mechanism for controlling actuation of the components such that, in use, each of the components is advanceable only when the other component is anchored, and sensor means associated with both the components and sensitive to movement of at least one of the components relative to the other component.

* * * * *